(12) United States Patent
Peng et al.

(10) Patent No.: US 12,524,613 B2
(45) Date of Patent: Jan. 13, 2026

(54) SYSTEMS AND METHODS FOR ENSEMBLING SOFT PROMPTS IN FEW-SHOT FINE-TUNING OF LANGUAGE MODELS

(71) Applicant: Salesforce, Inc., San Francisco, CA (US)

(72) Inventors: Xiangyu Peng, Atlanta, GA (US); Chen Xing, Palo Alto, CA (US); Prafulla Kumar Choubey, San Jose, CA (US); CHien-Sheng Wu, Mountain View, CA (US)

(73) Assignee: Salesforce, Inc., San Francisco, CA (US)

( * ) Notice: Subject to any disclaimer, the term of this patent is extended or adjusted under 35 U.S.C. 154(b) by 371 days.

(21) Appl. No.: 18/160,967

(22) Filed: Jan. 27, 2023

(65) Prior Publication Data
US 2024/0070394 A1    Feb. 29, 2024

Related U.S. Application Data

(60) Provisional application No. 63/399,595, filed on Aug. 19, 2022.

(51) Int. Cl.
*G06F 40/284* (2020.01)
*G06F 40/40* (2020.01)
*G06F 16/25* (2019.01)

(52) U.S. Cl.
CPC ............ *G06F 40/284* (2020.01); *G06F 40/40* (2020.01); *G06F 16/25* (2019.01)

(58) Field of Classification Search
None
See application file for complete search history.

(56) References Cited

U.S. PATENT DOCUMENTS

| 2020/0065374 | A1* | 2/2020 | Gao | G06N 3/08 |
| 2021/0209513 | A1* | 7/2021 | Torres | G06N 20/00 |
| 2023/0162040 | A1* | 5/2023 | Clement | G06N 3/082 |
| | | | | 706/21 |

(Continued)

OTHER PUBLICATIONS

Lester et al., "The Power of Scale for Parameter-Efficient Prompt Tuning", Sep. 2, 2021, Google Research. (Year: 2021).*

(Continued)

*Primary Examiner* — Pierre Louis Desir
(74) *Attorney, Agent, or Firm* — Haynes and Boone, LLP

(57) ABSTRACT

Embodiments described herein provide a mechanism that ensembles trainable soft prompts to transfer knowledge from source tasks under few-shot learning settings. Specifically, given a source task input from a source task training dataset, a set of soft prompts may be trained using a frozen PLM on the large-scale source task training dataset. The set of soft prompts are then prepended to a target task input, based on which the frozen pre-trained language model generates a set of logits for predicting classification of the target task input, respectively. An attention module is used to generate input-logit attention scores, which are used to compute a weighted linear combination of the logits given the attention scores. The weighted linear combination are the final logits to predict the final classification of the target task input.

20 Claims, 16 Drawing Sheets

(56) References Cited

U.S. PATENT DOCUMENTS

2024/0220215 A1* 7/2024 Clement .................. G06F 8/35

OTHER PUBLICATIONS

Houlsby et al., "Parameter-Efficient Transfer Learning for NLP", Jun. 13, 2019, Google Research—Proceedings of 36th International Conference on Machine Learning (Year: 2019).*
Vaswani et al., "Attention Is All You Need", Dec. 6, 2017, Google Research—31st Conference on Neural Information Processing Systems (Year: 2017).*
Lester et al. ("The Power of Scale for Parameter-Efficient Prompt Tuning") Google Research Apr. 18, 2021 (Year: 2021).*
Houlsby et al. ("Parameter-Efficient Transfer Learning for NLP") Proceedings of the 36 th International Conference on Machine Learning Jun. 13, 2019 (Year: 2019).*
Vaswani et al. ("Attention Is All You Need") 31st Conference on Neural Information Processing Systems Dec. 6, 2017 (Year: 2017).*
Mao et al. ("UNIPELT: A Unified Framework for Parameter-Efficient Language Model Tuning") Facebook At Oct. 14, 2021 (Year: 2021).*
Gu et al, "PPT: Pre-trained Prompt Tuning for Few-shot Learning", arXiv:2109.04332v3 [cs.CL] Mar. 14, 2022, pp. 1-14.
Asai et al, "ATTEMPT: Parameter-Efficient Muli-task Tuning via Attentional Mixtures of Soft Prompts", arXiv:2205.1196v2 [cs.CL] Dec. 1, 2022, pp. 1-18.
Vu et al, "SPoT: Better Frozen Model Adaptation through Soft Prompt Transfer", arXiv:2110.07904v2 [cs.CL] Mar. 16, 2022, pp. 1-21.
Lester, "The Power of Scale for Parameter-Efficient Prompt Tuning", arXiv:2104.08691v2 [cs.CL] Sep. 2, 2021, pp. 1-15.

\* cited by examiner

| Model | Method | WNLI | MRPC | RTE | MultiRC | BoolQ | WiC | WSC | CB | Avg$_{std}$ |
|---|---|---|---|---|---|---|---|---|---|---|
| T5-Base | SPoT-t | 54.44 | 53.32 | 54.15 | 50.61 | 56.87 | 54.51 | 47.98 | 43.48 | 51.92$_{10.64}$ |
| | PPT | 47.89 | 68.97 | 67.51 | 60.32 | 51.81 | 57.25 | 63.46 | 50.00 | 58.40$_{1.03}$ |
| | ATTEMPT | 52.95 | 75.35 | 52.63 | 59.52 | 54.28 | 54.48 | 43.89 | 43.74 | 54.61$_{6.48}$ |
| | Uni Ensemble | 56.34 | 75.00 | 57.40 | 65.92 | 70.12 | 62.69 | 45.19 | 57.14 | 61.22$_{3.87}$ |
| | MV Ensemble | 50.24 | 74.65 | 59.87 | 71.39 | 73.97 | 71.59 | 49.71 | 65.82 | 64.66$_{2.15}$ |
| | FW Ensemble | 50.07 | 77.57 | 65.03 | 66.32 | 72.28 | 63.14 | 51.39 | 43.74 | 62.28$_{4.38}$ |
| | SESoM | 56.34 | 84.34 | 66.06 | 66.91 | 74.80 | 63.68 | 53.56 | 74.02 | 67.54$_{2.16}$ |
| T5-Large | SPoT-t | 54.93 | 72.46 | 65.14 | 64.89 | 53.66 | 56.26 | 48.76 | 53.70 | 58.72$_{14.23}$ |
| | PPT | 43.66 | 79.41 | 75.81 | 65.50 | 67.08 | 53.61 | 61.54 | 80.36 | 65.95$_{1.00}$ |
| | ATTEMPT | 42.25 | 67.96 | 62.63 | 70.11 | 68.42 | 54.33 | 60.04 | 69.64 | 61.92$_{3.37}$ |
| | Uni Ensemble | 56.34 | 86.76 | 67.14 | 74.36 | 78.83 | 64.42 | 60.42 | 58.78 | 68.38$_{3.35}$ |
| | MV Ensemble | 40.58 | 84.20 | 58.10 | 73.00 | 78.58 | 72.67 | 53.09 | 56.00 | 65.81$_{2.88}$ |
| | FW Ensemble | 56.34 | 83.74 | 77.97 | 73.63 | 81.28 | 61.44 | 56.73 | 62.85 | 69.24$_{2.19}$ |
| | SESoM | 56.34 | 87.84 | 82.80 | 74.40 | 81.24 | 67.06 | 63.08 | 84.73 | 74.69$_{0.89}$ |
| T5-XL | SPoT-t | 56.34 | 77.65 | 73.16 | 51.07 | 60.97 | 59.83 | 50.58 | 70.89 | 62.77$_{14.52}$ |
| | PPT | 50.07 | 76.22 | 75.83 | 67.57 | 69.89 | 58.62 | 59.73 | 78.92 | 67.10$_{3.82}$ |
| | ATTEMPT | 49.37 | 62.46 | 84.24 | 71.26 | 60.39 | 42.50 | 45.38 | 80.18 | 61.97$_{6.65}$ |
| | Uni Ensemble | 56.34 | 75.73 | 89.16 | 76.56 | 81.07 | 58.77 | 63.40 | 78.57 | 72.45$_{2.61}$ |
| | MV Ensemble | 41.29 | 73.46 | 84.24 | 75.30 | 77.48 | 64.43 | 49.49 | 82.83 | 68.57$_{2.87}$ |
| | FW Ensemble | 56.27 | 85.62 | 89.58 | 70.20 | 82.83 | 66.79 | 57.55 | 73.48 | 73.54$_{2.41}$ |
| | SESoM | 56.34 | 88.21 | 89.71 | 76.90 | 82.50 | 68.56 | 63.41 | 84.15 | 76.22$_{1.44}$ |

FIG. 8

| Model | # s. | WNLI | MRPC | RTE | MultiRC | BoolQ | WiC | WSC | CB | Avg$_{std}$ |
|---|---|---|---|---|---|---|---|---|---|---|
| T5-Base | 1 | 54.44 | 53.32 | 54.15 | 50.61 | 56.87 | 54.51 | 47.98 | 43.48 | 51.92$_{10.64}$ |
| | 3 | 56.97 | 72.59 | 62.49 | 61.59 | 67.48 | 61.43 | 48.08 | 64.11 | 61.84$_{7.48}$ |
| | 5 | 56.41 | 81.91 | 64.01 | 66.08 | 72.96 | 61.54 | 49.04 | 69.46 | 65.18$_{3.40}$ |
| T5-Large | 1 | 54.93 | 72.46 | 65.14 | 64.83 | 53.66 | 56.26 | 48.76 | 53.70 | 58.72$_{14.29}$ |
| | 3 | 56.34 | 86.27 | 72.17 | 73.55 | 76.36 | 62.24 | 56.30 | 68.04 | 68.91$_{6.93}$ |
| | 5 | 56.34 | 87.43 | 77.60 | 74.09 | 80.28 | 66.05 | 60.19 | 80.98 | 72.87$_{3.41}$ |

FIG. 9

| Data Size | Method | WNLI | MRPC | RTE | MultiRC | BoolQ | WiC | WSC | CB | Avg |
|---|---|---|---|---|---|---|---|---|---|---|
| 64 | PPT | 48.51 | 68.53 | 69.22 | 60.54 | 62.04 | 53.59 | 62.00 | 54.29 | 59.84₁.₈₃ |
| | ATTEMPT | 52.68 | 76.76 | 55.88 | 58.87 | 62.35 | 57.74 | 48.46 | 50.36 | 57.89₄.₀₀ |
| | FW Ensemble | 53.80 | 77.87 | 65.68 | 64.78 | 72.65 | 62.66 | 50.96 | 58.21 | 63.33₄.₄₀ |
| | SESoM | 57.69 | 84.56 | 67.33 | 69.18 | 76.09 | 63.71 | 60.92 | 77.14 | 69.58₁.₄₂ |
| 128 | PPT | 50.14 | 68.68 | 66.75 | 62.27 | 62.16 | 51.25 | 61.81 | 75.83 | 62.36₂.₉₃ |
| | ATTEMPT | 54.37 | 77.60 | 60.29 | 58.31 | 66.47 | 53.89 | 51.35 | 69.29 | 61.44₅.₂₀ |
| | FW Ensemble | 53.55 | 79.80 | 67.36 | 59.78 | 62.65 | 56.08 | 55.58 | 74.29 | 63.64₄.₄₉ |
| | SESoM | 58.10 | 84.61 | 68.09 | 68.87 | 75.93 | 63.73 | 61.54 | 82.86 | 70.46₁.₀₆ |
| Full | PPT | 50.70 | 87.50 | 80.87 | 71.39 | 79.57 | 66.61 | 62.78 | 78.57 | 72.24₀.₀₁ |
| | ATTEMPT | 55.56 | 88.14 | 75.31 | 70.86 | 79.37 | 68.50 | 59.23 | 75.36 | 71.54₁.₈₉ |
| | FW Ensemble | 54.93 | 89.46 | 79.06 | 68.59 | 75.82 | 66.46 | 63.46 | 70.79 | 71.82₀.₈₄ |
| | SESoM | 57.75 | 89.92 | 79.42 | 72.14 | 80.79 | 67.54 | 63.50 | 86.43 | 74.69₀.₂₅ |

FIG. 10

| Method | WNLI | MRPC | RTE | MultiRC | BoolQ | WiC | WSC | CB | Avg |
|---|---|---|---|---|---|---|---|---|---|
| Ensemble acc SP | 52.96 | 79.69 | 64.15 | 63.92 | 74.46 | 60.97 | 52.34 | 71.25 | 64.96 $_{4.29}$ |
| PLG | 50.07 | 77.57 | 65.03 | 65.32 | 72.98 | 63.14 | 51.39 | 43.74 | 61.15 $_{6.97}$ |
| SESoM | 56.34 | 84.34 | 66.66 | 66.91 | 74.80 | 63.68 | 53.56 | 74.02 | 67.54 $_{2.16}$ |

FIG. 11

Example # 1 [MRPC]

s_1: Unable to find a home for him, a judge told mental health authorities they needed to find supervised housing and treatment for DeVries somewhere in California.
s_2: The judge had told the state Department of Mental Health to find supervised housing and treatment for DeVries somewhere in California.

| Pred | 1 (Equivalent) | | | | | | |
|---|---|---|---|---|---|---|---|
| Label | 1 (Equivalent) | | | | | | |
| Preds from individual source | MNLI | SST2 | QNLI | QQP | SQuAD | ReCoRD | Source Models |
| | 0% | 0% | 1 | 1 | 0% | 0% | |
| Weights from SESoM | 0.0120 | 0.0708 | 0.1346 | 0.5857 | 0.1266 | 0.0702 | |

Example # 2 [MRPC]

s_1: This integrates with Rational PurifyPlus and allows developers to work in supported versions of Java, Visual C # and Visual Basic.NET.
s_2: IBM said the Rational products were also integrated with Rational PurifyPlus, which allows developers to work in Java, Visual C # and VisualBasic.Net.

| Pred | 1 (Equivalent) | | | | | | |
|---|---|---|---|---|---|---|---|
| Label | 1 (Equivalent) | | | | | | |
| Preds from individual source | MNLI | SST2 | QNLI | QQP | SQuAD | ReCoRD | Source Models |
| | 1 | 1 | 1 | 0% | 0% | 0% | |
| Weights from SESoM | 0.2381 | 0.2055 | 0.2486 | 0.2240 | 0.0219 | 0.0620 | |

FIG. 12

| Model | Method | WNLI | MRPC | RTE | MultiRC | BoolQ | WiC | WSC | CB |
|---|---|---|---|---|---|---|---|---|---|
| T5-base | $d_x$ | 32 | 32 | 100 | 100 | 64 | 100 | 64 | 128 |
| | $d_t$ | 32 | 32 | 100 | 100 | 64 | 100 | 100 | 128 |
| | $d$ | 32 | 128 | 100 | 100 | 64 | 100 | 100 | 128 |
| | $G$'s dropout % | 50 | 0 | 0 | 0 | 0 | 0 | 0 | 0 |
| T5-large | $d_x$ | 100 | 64 | 64 | 32 | 100 | 100 | 32 | 64 |
| | $d_t$ | 100 | 64 | 256 | 32 | 64 | 64 | 32 | 64 |
| | $d$ | 100 | 64 | 512 | 128 | 100 | 100 | 64 | 256 |
| | $G$'s dropout % | 50 | 0 | 0 | 50 | 0 | 0 | 50 | 0 |
| T5-XL | $d_x$ | 100 | 32 | 32 | 100 | 64 | 64 | 64 | 64 |
| | $d_t$ | 100 | 64 | 64 | 100 | 128 | 64 | 64 | 64 |
| | $d$ | 100 | 64 | 64 | 100 | 256 | 512 | 64 | 512 |
| | $G$'s dropout % | 50 | 0 | 50 | 0 | 0 | 0 | 50 | 0 |

FIG. 13

| Data Size | Method | WNLI | MRPC | RTE | MultiRC | BoolQ | WiC | WSC | CB | Avg |
|---|---|---|---|---|---|---|---|---|---|---|
| 8 | FW Ensemble | 53.73 | 71.10 | 58.70 | 63.17 | 72.44 | 63.17 | 51.44 | 61.52 | 61.90₃.₉₇ |
| | SESoM | 58.31 | 78.01 | 63.65 | 60.91 | 71.27 | 62.73 | 54.97 | 66.61 | 65.31₃.₁₄ |

FIG. 14

| Data Size | Method | WNLI | MRPC | RTE | MultiRC | BoolQ | WiC | WSC | CB | Avg |
|---|---|---|---|---|---|---|---|---|---|---|
| 8 | SESoM w/o PT | 58.24 | 76.34 | 63.16 | 66.45 | 69.50 | 63.08 | 54.97 | 67.41 | 64.89 3.46 |
| 8 | SESoM w. PT | 58.31 | 78.01 | 63.65 | 66.91 | 71.27 | 62.73 | 54.97 | 66.61 | 65.31 3.14 |
| 32 | SESoM w/o PT | 55.21 | 82.57 | 65.20 | 63.53 | 74.89 | 62.74 | 53.37 | 75.18 | 66.59 3.81 |
| 32 | SESoM w. PT | 58.31 | 84.22 | 66.86 | 66.72 | 72.87 | 64.20 | 53.56 | 72.86 | 67.45 2.41 |
| 128 | SESoM w/o PT | 58.24 | 83.61 | 65.89 | 63.89 | 75.74 | 63.52 | 55.29 | 74.29 | 67.57 2.57 |
| 128 | SESoM w. PT | 58.10 | 84.61 | 68.09 | 68.87 | 75.93 | 63.73 | 61.54 | 82.86 | 70.46 1.06 |

FIG. 15

| Method | WNLI | MRPC | RTE | MultiRC | BoolQ | WiC | WSC | CB | Avg |
|---|---|---|---|---|---|---|---|---|---|
| Hard Variant | 48.52 | 73.00 | 54.49 | 53.58 | 60.53 | 56.17 | 49.18 | 56.52 | 56.50₇.₆₆ |
| SESoM | 56.34 | 84.34 | 66.66 | 66.91 | 74.80 | 63.68 | 53.56 | 74.02 | 67.54₂.₁₆ |

SYSTEMS AND METHODS FOR ENSEMBLING SOFT PROMPTS IN FEW-SHOT FINE-TUNING OF LANGUAGE MODELS

CROSS REFERENCE(S)

The instant application is a nonprovisional of and claims priority under 35 U.S.C. 119 to U.S. provisional application No. 63/399,595, filed Aug. 19, 2022, which is hereby expressly incorporated by reference herein in its entirety.

TECHNICAL FIELD

The embodiments relate generally to natural language processing and machine learning systems, and more specifically to a trainable ensembling of soft prompts for few-shot fine-tuning of language models.

BACKGROUND

Machine learning systems have been widely used in natural language processing tasks, such as question answering, summarization, intent classification, and/or the like. Textual, or discrete/hard, prompts, which are pre-designed templates (e.g., "the sentence is about [what]"), can often be used to make predictions with language models. However, language models are sensitive to the choice of textual prompts. Alternatively, soft/continuous prompts can be used. A soft/continuous prompt is a sequence of additional task-specific tunable tokens prepended (i.e., placed at the beginning) or appended (i.e., placed at the end) to the input sequence and are learned on the task-specific data, a process sometimes called prompt tuning. Prompt tuning can be an efficient and effective paradigm for large-scale language models because during tuning, only the prompts are being updated while the relatively large language model remains frozen. In this way, parameters that need to be updated are relatively small-scale as compared to updating the entire language model. However, under few-shot settings (e.g., when training samples may be scarce for a particular task), prompt tuning may not achieve desirable fine-tuning performance.

Therefore, there is a need for an improved system for prompt tuning.

BRIEF DESCRIPTION OF THE DRAWINGS

FIGS. 8-16 provide charts illustrating exemplary performance and system configurations, according to embodiments described herein.

Figure 1:
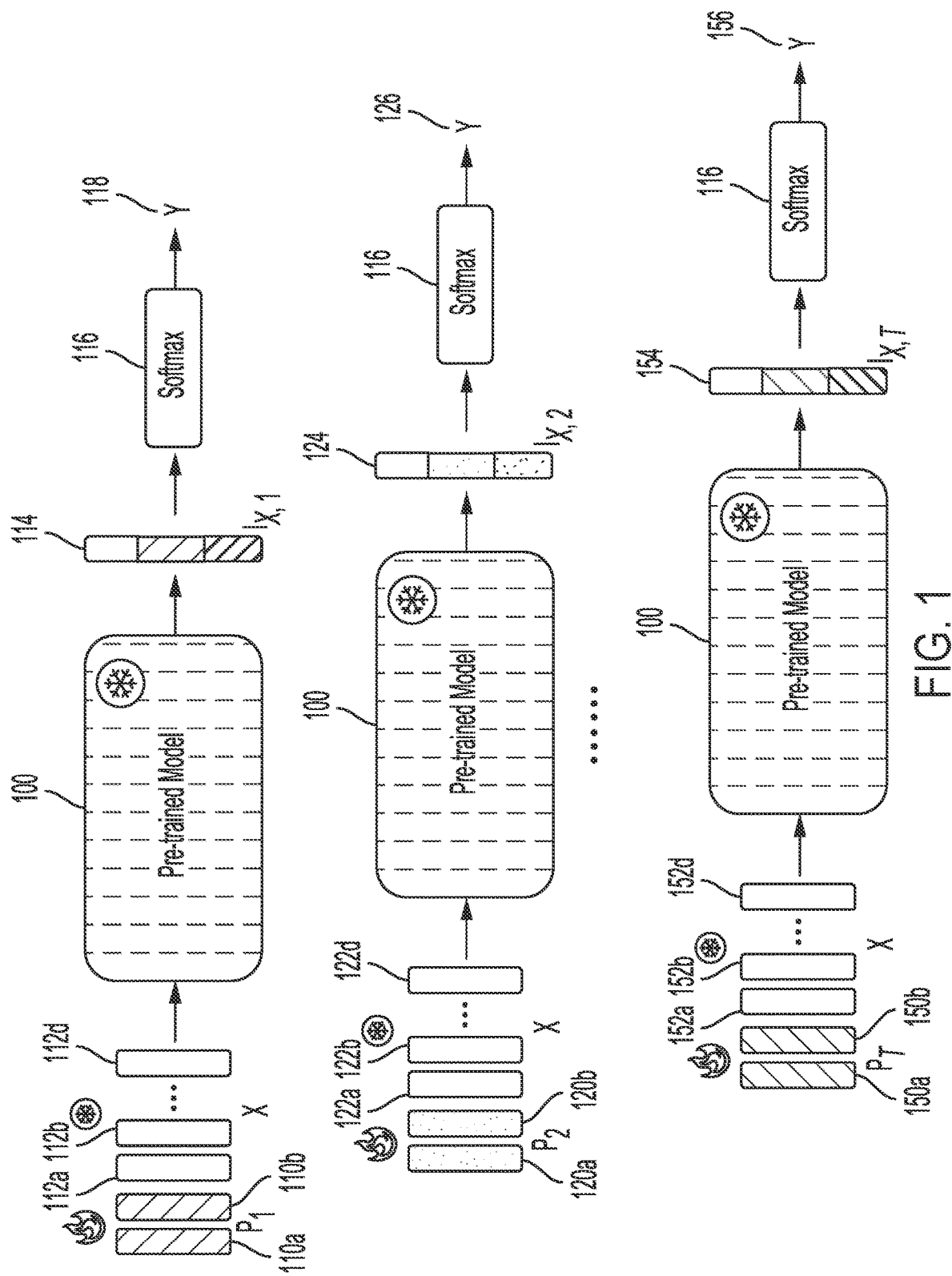
FIG. 1 is a simplified block diagram illustrating a soft-prompt tuning framework, according to embodiments described herein.

Embodiments of the disclosure and their advantages are best understood by referring to the detailed description that follows. It should be appreciated that like reference numerals are used to identify like elements illustrated in one or more of the figures, wherein showings therein are for purposes of illustrating embodiments of the disclosure and not for purposes of limiting the same.

DETAILED DESCRIPTION

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

As used herein, the term "prepend" describes the relative placement of one object before another. In addition, wherever "prepend" is used in the description it should be understood that "append" is also a possible configuration, where "append" describes the relative placement of one object after another.

Prompt tuning refers to a training and/or tuning paradigm that updates task-specific soft prompts while keeping a pre-trained language model frozen. Soft-prompt tuning provides an efficient and effective solution for adapting large-scale pre-trained language models (PLMs) to downstream tasks because the updating of soft-prompts are relatively computationally efficient compared to updating the entire pre-trained language model. However, because prompt-tuning does not further update the PLMs but relies on updating the soft-prompts, tuning performance largely relies on the availability of data sample quality. For example, with limited training samples in few-shot settings, prompt tuning often fails to achieve desirable performance.

In view of the need for an improved system for prompt running in few-shot settings, embodiments described herein provide a mechanism that ensembles trainable soft prompts to transfer knowledge from source tasks under few-shot learning settings. Specifically, given a set of source tasks and corresponding large-scale datasets, a task-specific source soft prompt (or a task-specific set of soft prompts) may be trained using a frozen PLM on each of the source task training datasets. The set of soft prompts are then prepended to a target task input, based on which the frozen pre-trained language model generates a set of logits for predicting classification of the target task input, respectively. An attention module is used to generate input-logit attention scores, which are used to compute a weighted linear combination of the logits given the attention scores. The weighted linear combination is the final logit used to predict the final classification of the target task input.

In this way, the mechanism takes advantage of pre-trained and/or random initialized soft prompts and achieves a significant result under few-shot learning settings. It is also interpretable because an attention framework generates a weight for each source tasks contribution to the final prediction.

Overview

FIG. 1 is a simplified block diagram illustrating an aspect of training source prompts on one or more source training datasets, according to embodiments described herein. Specifically, soft prompts may take the form of sequences of continuous vectors and/or tokens that are not from the PLM's vocabulary, as opposed to hard prompts which are sequences of discrete words, subwords, or tokens from the PLM's vocabulary.

For example, given the training data for source tasks $S_1, \ldots, S_T$ and a pre-trained language model 100, a soft prompt $P_j$ ($j \in [1, T]$) may be trained for each source task by running prompt tuning. Each soft prompt may be composed of a sequence of soft prompt embeddings, e.g., 110*a-b*, 120*a-b*, 150*a-b*. For example, the source tasks may be question answering, natural language inference, paraphrasing, etc.

For instance, the PLM 100 may adopt T5-setting, all downstream tasks are structured in a text-to-text generation format, where each label of a training sample is represented by a verbalizer and, optionally, a task-specific template. Thus, an instance in a source or target task is represented as (X,y), where X is a sequence of token embeddings ($X=[x_1, \ldots, x_l] \in \mathbb{R}^{1 \times d}$, where l is the length of the input token sequence and d is the embedding size of PLM), and y is a classification label. Then, the class label y is mapped to its corresponding verbalizer or the verbalizer-template sequence, represented by Y. Each soft prompt $P_j=[p_1, \ldots, p_m] \in \mathbb{R}^{m \times d}$ is also a sequence of embeddings, where m is the number of soft prompt embeddings for the task.

In one embodiment, as shown in FIG. 1, for each source task $S_1, \ldots, S_T$, a randomly initialized task-specific soft $P_j$ ($j \in [1, T]$) (e.g., 110*a-b*, 120*a-b*, 150*a-b*) may be prepended to the input sequence embedding X (e.g., 112*a-d*, 122*a-d*, 152*a-d*) corresponding to the respective source task. Then a pre-trained language model 100 generates a task-specific output logit (e.g., 114, 124, 154) from a concatenation of the input data and soft prompt. Normalizing the task-specific output logit with a softmax operation 116 generates a predicted source output Y (e.g., 118, 126, 156) corresponding to the respective source task. Finally, the predicted source output 118, 126, 156 and the corresponding source output label from the source training data can be compared to compute a cross-entropy loss. The cross-entropy loss may then be used to backpropagate to update the soft prompt $P_j$ ($j \in [1, T]$) (e.g., 110*a-b*, 120*a-b*, 150*a-b*), respectively, while keeping the PLM 100 frozen.

In the example shown in FIG. 1 with T source tasks, the parameters of the PLM 100 are held fixed ("frozen") during training. Corresponding to the first source task, the PLM 100 receives a first training input sequence comprising embeddings 110*a-b*, 112*a-d*. To create the first training input sequence, first soft prompt $P_1$ comprising tokens 110*a-b* is prepended to the source input X comprising embeddings 112*a-d*. The first soft prompt $P_1$ includes a sequence of first soft prompt embeddings 110*a*, 110*b*. The source input includes a sequence of first source input embeddings 112*a-d*. It is noted that the number of soft prompt embeddings and source input embeddings shown in FIG. 1 are for illustrative purpose only. These numbers may vary depending on the requirements of the PLM and/or source tasks.

After receiving the first training input sequence, the PLM 100 generates a first output logit, $l_{x,1}$, 114. Next, the softmax decoder 104 generates a first predicted source output, Y, 118 from the first output logit, $l_{x,1}$, 114. Next, the first predicted source output 118 and a corresponding source output may be compared through a loss function. The soft prompt 110*a-b* is updated based on the loss function via backpropagation while the PLM 100 remains frozen. In this way, the first source task may be modeled as $Pr_\theta(Y|[P_1;X])$, which is maximized while updating the soft prompt $P_1$, and where $[P_1; X]$ denotes the first training input sequence, i.e. the first soft prompt prepended to the source input by concatenation, and $\theta$ represents the parameters of the PLM 100.

Similarly, corresponding to the second source task, the PLM 100 receives a second training input sequence comprising embeddings 120*a-b*, 122*a-d*. To create the second training input sequence, second soft prompt $P_2$ comprising tokens 120*a-b* is prepended to the source input X comprising embeddings 122*a-d*. The source input may be the same or different as used in other source tasks. The second soft prompt $P_2$ includes a sequence of second soft prompt embeddings 120*a-b*. The source input includes a sequence of second source input embeddings 122*a-d*. It is noted that the number of soft prompt embeddings and source input embeddings shown in FIG. 1 are for illustrative purpose only. These numbers may vary depending on the requirements of the PLM and/or source tasks.

After receiving the second training input sequence, the PLM 100 generates a second output logit, $l_{x,2}$, 124. Next, the softmax decoder 104 generates a second predicted source output, Y, 126 from the second output logit, $l_{x,2}$, 124. The second predicted source output may be the same or different for different source tasks. Next, the second predicted source output 126 and a corresponding source output may be compared through a loss function. The soft prompt 120*a-b* is updated based on the loss function via backpropagation while the PLM 100 remains frozen. In this way, the second source task may be modeled as $Pr_\theta(Y|[P_2; X])$, which is maximized while updating the soft prompt $P_2$, and where $[P_2; X]$ denotes the second training input sequence, i.e. the second soft prompt prepended to the source input by concatenation, and $\theta$ is the parameters of the PLM.

This method is iterated multiple times for each source task, ending after training all the soft prompts for each source task.

Corresponding to the last, or T-th, source task, the PLM 100 receives a T-th training input sequence comprising embeddings 150*a-b*, 152*a-d*. To create the second training input sequence, T-th soft prompt $P_T$ comprising tokens 150*a-b* is prepended to the source input X comprising embeddings 152*a-d*. The source input may be the same or different as used in other source tasks. The T-th soft prompt $P_T$ includes a sequence of T-th soft prompt embeddings 150*a-b*. The source input includes a sequence of T-th source input embeddings 152*a-d*. It is noted that the number of soft prompt embeddings and source input embeddings shown in FIG. 1 are for illustrative purpose only. These numbers may vary depending on the requirements of the PLM and/or source tasks.

After receiving the T-th training input sequence, the PLM 100 generates a T-th output logit, $l_{x,T}$, 154. Next, the softmax decoder 104 generates a T-th predicted source output, Y 156 from the T-th output logit, $l_{x,T}$, 154. The T-th predicted source output may be the same or different for different source tasks. Next, the T-th predicted source output 156 and a corresponding source output may be compared through a loss function. The soft prompt 150*a-b* is updated based on the loss function via backpropagation while the PLM 100 remains frozen. In this way, the T-th source task may be modeled as $Pr_\theta(Y|[P_T; X])$, which is maximized while updating the soft prompt $P_T$, and where $[P_T; X]$ denotes the T-th training input sequence, i.e. the T-th soft prompt prepended to the source input by concatenation, and $\theta$ is the parameters of the PLM.

Figure 2:
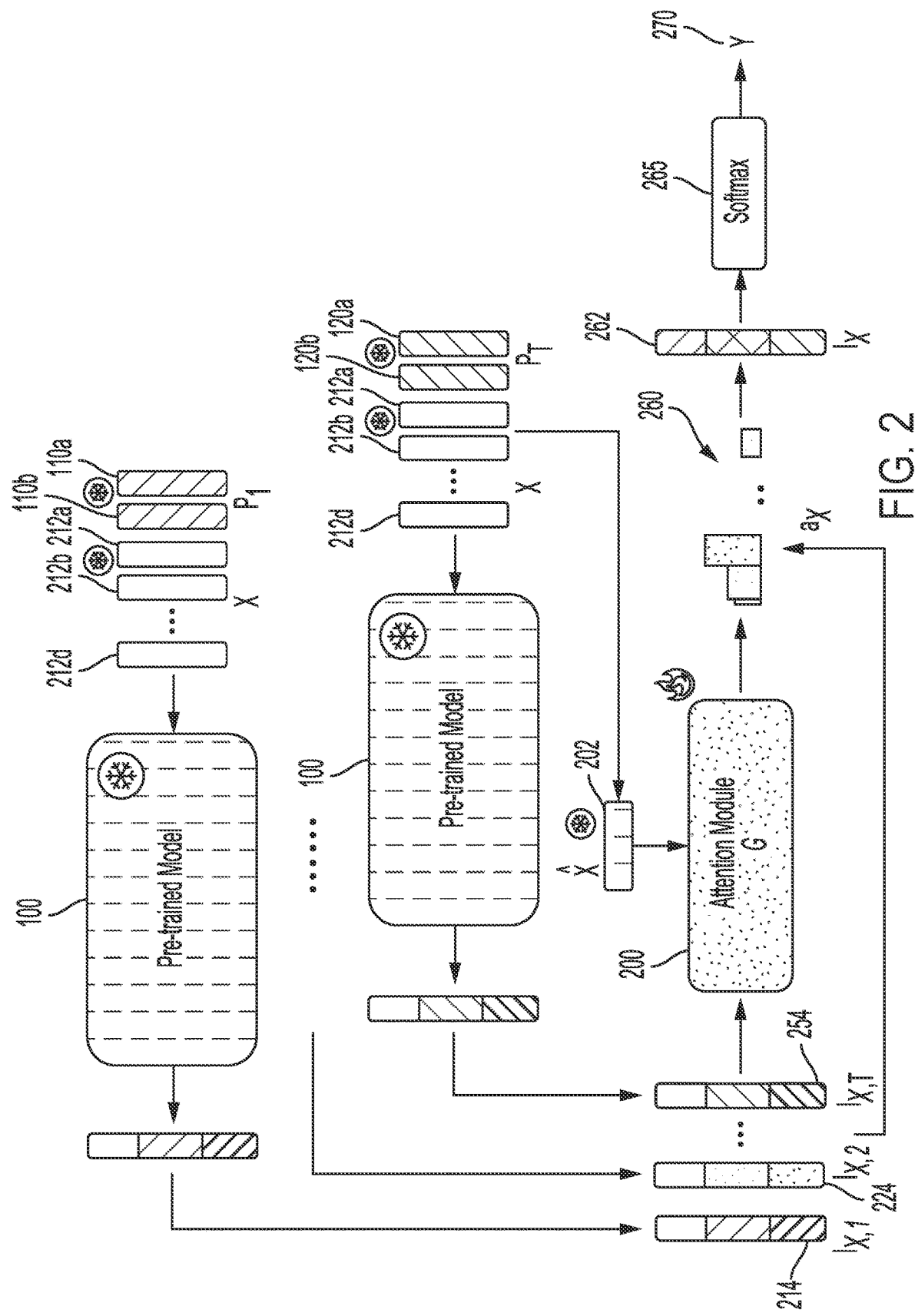
FIG. 2 is a simplified block diagram illustrating an ensembled soft prompt tuning framework, according to embodiments described herein.

FIG. 2 is a simplified block diagram illustrating an aspect of using ensembled soft prompts trained as described in FIG. 1 to train an attention module that generates a classification logit for a target input from a target training dataset, according to embodiments described herein. Given a collection of source prompts $[P_1; \ldots; P_T]$ (e.g., 110a-b, 120a-b, 150a-b) from source tasks $[S_1; \ldots; S_T]$ trained as described in FIG. 1, or not trained, and the PLM 100 with parameters $\theta$, the ensembled soft prompt tuning framework shown in FIG. 2 may be used to train an attention module 200 so that the framework can make predictions for a target task. Specifically, the ensembled soft prompt tuning framework is operated with the PLM 100 paired with a prompt for a source task to train the attention module 200. The prompt from a source task together with the PLM 100 is jointly referred to as a source model, represented as $[P_j; \theta]$. Thus, each source model $[P_j; \theta]$ is trained with the few-shot target data in a prompt-tuning manner. This enforces the source models to generate target task's verbalizers given the target input sample 212a-d.

In one embodiment, given a labeled instance (X,y) from the few-shot target training dataset corresponding to a target task $T_{target}$, trained or untrained (e.g., randomly initialized) soft prompts (e.g. 110a-b, 120a-b, or 150a-b) may be prepended to the target input data sample X, referred to as $[P_j; X]$. The input data sequence may comprise one or more embeddings 212a-d. The prepended input $[P_j; X]$ is then fed into the corresponding source model $[P_j; \theta]$, i.e, the PLM 100, to generate one or more pre-softmax logits $l_{x,j}$ (e.g., 214, 224, 254) from the input data and soft prompts $[P_j; X]$. The generated logits $l_{x,j}$ (e.g., 214, 224, 254) and a representation 202 of the input (e.g., 212a-d) are sent to the attention module 200 that generates sample-specific attention weights 260 representing the competence of the source model $[P_j; \theta]$ for the given input X (e.g., 212a-d).

In one embodiment, a final logit 262 is generated from a linear combination of the one or more logits $L_x = [l_{x,1}; \ldots; l_{x,T}] \in \mathbb{R}^{T \times v}$ (e.g., 214, 224, 254) across source tasks 1, ..., T, where v is the vocabulary size of the pre-trained model. The weight of each logit in the linear combination is given by the attention weights/scores 260. The final logit can be used to make the prediction for input sample X.

In one embodiment, the final logit $l_x$ 262 is normalized with a softmax operation 265 to generate a predicted output 270. The predicted output 270 can be compared to the corresponding label y from the training instance to compute a cross-entropy loss. The parameters of the attention module 200 may then be updated via backpropagation based on the cross-entropy loss while the PLM 100 and all the source prompts $P_j$ are kept frozen.

More specifically, corresponding to the first source model, the PLM 100 receives a first training input sequence. To create the first training input sequence, first soft prompt $P_1$ 110a-b is prepended to the target input X from the target training dataset. The first soft prompt $P_1$ includes a sequence of first soft prompt embeddings 110a, 110b. The target input includes a sequence of target input embeddings 212a-d. It is to be noted that the number of soft prompt embeddings and target input embeddings shown in FIG. 2 are for illustrative purpose only, and may vary depending on the requirements of the PLM and/or target task and/or source tasks. After receiving the first training input sequence, the PLM 100 generates a first logit, $l_{x,1}$, 214.

This method is iterated for each source task 1, ..., T, ending the last source task T described below.

Corresponding to the T-th source task, the PLM 100 receives a T-th training input sequence. To create the T-th training input sequence, T-th soft prompt $P_T$ 150a-b is prepended to the target input X. The T-th soft prompt $P_T$ includes a sequence of T-th soft prompt embeddings 150a-b. The target input includes a sequence of target input embeddings 212a-d. The number of soft prompt embeddings and target input embeddings may have vary depending on the requirements of the PLM and/or target task and/or source tasks. After receiving the T-th training input sequence, the PLM 100 generates a T-th logit, $l_{x,T}$, 254.

Next, the attention module 200 generates attention scores 260 from the representation 202 of the input and from the task-specific logits 214, 224, 254 generated by the PLM 100. The attention scores 260 and the task-specific logits are combined to create a final logit 262. The final logit can be written in equation form as $l_x = \mathcal{G}(X, [l_{x,1} \ldots l_{x,T}])$, where $\mathcal{G}(\ldots)$ denotes the transformation of the attention module 200. The final logit 262 is transformed by a softmax decoder 204 to generate the predicted output, Y, 270.

In a configuration where the attention module is being trained, the predicted output, Y, 270 may be used to compute a loss function whose gradients are used to backpropagation to update parameters of the attention module 200. In some instances, the loss function may be the cross-entropy loss comparing the predicted output, Y, 270 and a target output.

Therefore, in this way, the attention module 200 is trained by minimizing its cross-entropy loss between softmax($l_x$) and the label Y. During few-shot training, the attention module 200 is updated with the few-shot labeled target samples. The attention module is thus trained to capture the sample-specific preference of different source models.

At inference, the attention module 200 is also used to calculate the sample specific ensemble weight of all source logits and calculate the weighted average of them as the final logit to make the prediction.

Figure 3:
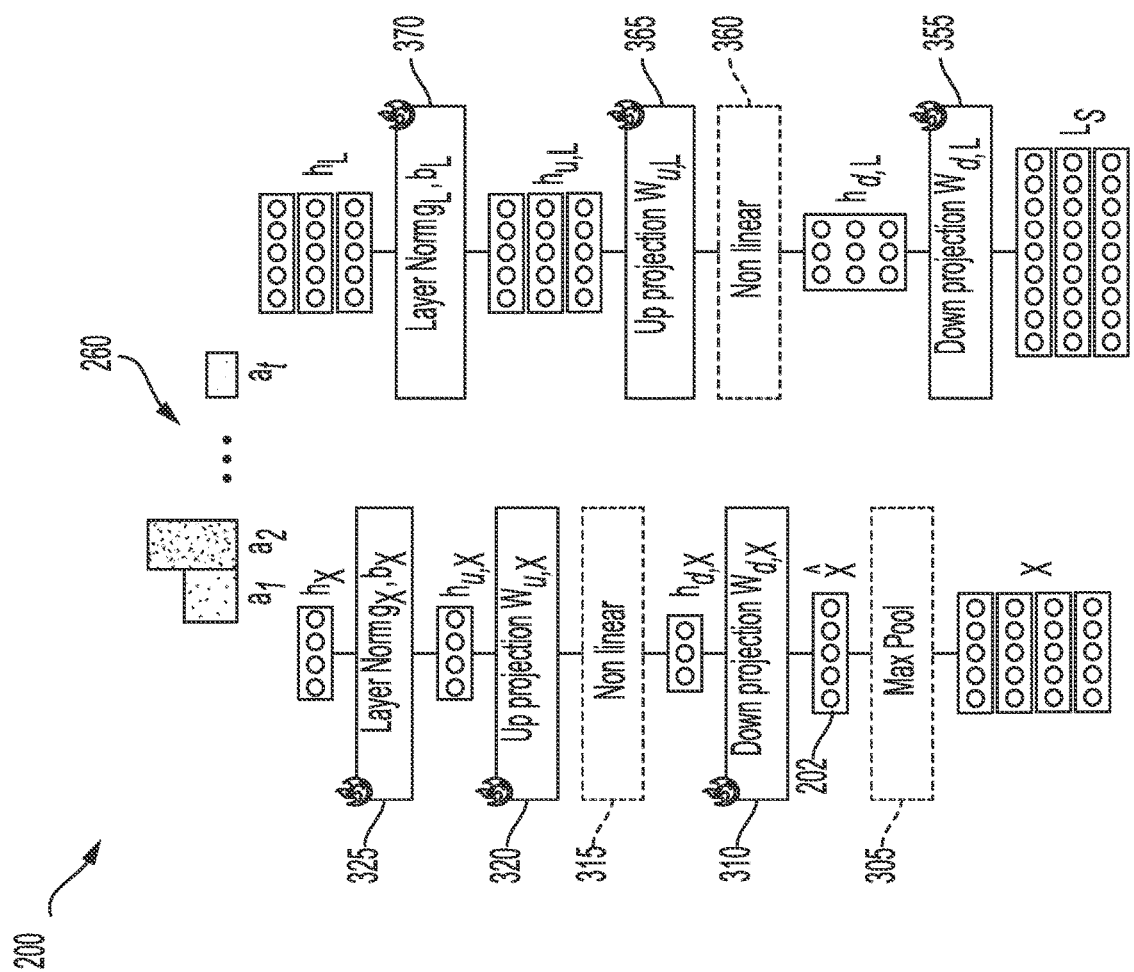
FIG. 3 is a simplified schematic illustrating the structure of an attention module, according to embodiments described herein.

FIG. 3 is a simplified schematic diagram illustrating an example structure of the attention module 200 as described in FIG. 2, according to embodiments described herein. As discussed in relation to FIG. 2, the attention module $\mathcal{G}$ 200 generate attention weights 260 to ensemble each source models' pre-softmax logits 214, 224 and 254 based on their competence on a target sample X 212a-d. One input of the attention module $\mathcal{G}$ 200 is therefore the representation 202 of target sample X 212a-d. Other candidate inputs of the attention module $\mathcal{G}$ 200 which might benefit this sample-specific weight generation process are pre-softmax logits 214, 224 and 254 of source models.

In one embodiment, the attention module 200 includes four projection layers 310, 320, 355, 365 two normalization layers 325, 370 for transforming the one or more logits 214, 224, 254, generated from the PLM 100, and the target sample X 212a-d.

In one embodiment, the attention module 200 includes a max pool transformation 305, down projection layers 310, 355, non linear transformations 315, 360, and up projection layers 320, 365 and normalization layers 325, 370. Beginning with the layers and transformations for transforming the target input 212a-d and another for transforming the logits 214, 224, 254 received from the PLM 100 as described in FIG. 2. In some stances, max pool 305 may be included in the broader ensembled soft prompt tuning system as opposed to a transformation occurring within the attention module 200. In the discussion that follows max pool 305 is included in the attention module 200.

The transformations of the attention module for the target input X are described now. First, max pool 305 transforms the target input of token embedding sequence $X=[x_1, \ldots, x_l] \in \mathbb{R}^{l \times d}$ into a representation of the input $\hat{x} \in \mathbb{R}^d$. The down projection, $W_{d,x}$, 310 may be applied to reduce the dimensions of the representation $\hat{x}$ 202 of the input. A non linear activation function, $\gamma(\ldots)$, 315 is applied to the results of down projection. The up projection, $W_{u,x}$, 320 may be applied to increase the dimensions of the results of the nonlinear activation function. Thus, the output from the up projection transformation may be computed as: $h_x = W_{u,x}^T \cdot \gamma(W_{d,x}^T \cdot \hat{x})$, where $$W_{d,x} \in R^{d \times d'_x} \text{ and } W_{u,x} \in R^{d'_x \times d'}$$

are trainable weights. The dimension of the down projected space of the input is $d'_x$ and the dimension of the up projected space is $d'$. Next, normalization layer 325 is applied to the results of up projection to normalize up-projected outputs, resulting in the output final projected representation $h_x$ of the target input.

In one embodiment, the attention module 200 transforms the one or more logits (e.g., $l_{x,1}, \ldots l_{x,T}$) in a similar manner. First, down projection, $W_{d,l}$ 355 reduces the dimensions of each of the one or more logits. Next a non linear activation function, $\gamma(\ldots)$, 360 is applied to the results of down projection. Next up projection, $W_{u,L}$, 365 increases the dimensions of the results of the nonlinear activation function. The output from the up projection transformation may be computed as: $h_{l,j} = W_{u,l}^T \cdot \gamma(W_{d,l}^T \cdot l_{x,j})$ where the $j = \{1, \ldots, T\}$ indexes the source tasks, and where $$W_{d,l} \in R^{v \times d'_l} \text{ and } W_{u,l} \in R^{d'_l \times d'}$$

are trainable weights. The dimension of the down project space of the logits is $d'_l$.

Next, normalization layer 370 is applied to the results of up projection, producing $\{h_{l,j}\}_{j=1}^T$, projected representations of all the logits generated from source tasks. Thus, given $h_x$ and the projected representations of all source logits $\{h_{l,j}\}_{j=1}^T$ the attention score 260 may be computed as:

$$a_{x,j} = \frac{e^{(h_{l,j} \cdot h_x)}}{\sum_{k=1}^T e^{(h_{l,k} \cdot h_x)}}.$$

Therefore, given the final output logit $l_x \in \mathbb{R}^v$ by computing a linear combination of $[l_{x,1}, \ldots, l_{x,T}]$, the final output logit $l_x$ is computed based on the input-logit attention scores as:

$$l_x = \mathcal{G}(\hat{x}, [l_{x,1}; \ldots; l_{x,T}]) = \sum_{j=1}^T a_{x,j} l_{x,j}$$

Therefore, compared to traditional approaches in which an ensemble of T models leads to T times more model parameters, here an ensemble of T different prompt-tuning models only leads to T times more soft prompts. The difference in number of model parameters arises because the pre-trained model that soft prompts are trained to condition on is identical for all models to be ensembled. Therefore, the additional model parameters introduced by the ensemble are only the soft prompts of T source tasks, i.e. T×m×d parameters (0.6 M parameters in one embodiment). In one embodiment, the attention module includes four projection layers and two layer norms. The attention module requires $d \times d'_x + d'_x \times d' + v \times d'_l + d'_l \times d' + 4d'$ parameters (approximately 0.9 M parameters in one embodiment). Therefore, the total number of additional trainable model parameters in one embodiment is less than 0.5% of a pre-trained T5-base model, which greatly reduces computational overhead in training the neural network for a target task and improves system efficiency.

Computer and Network Environment

Figure 4:
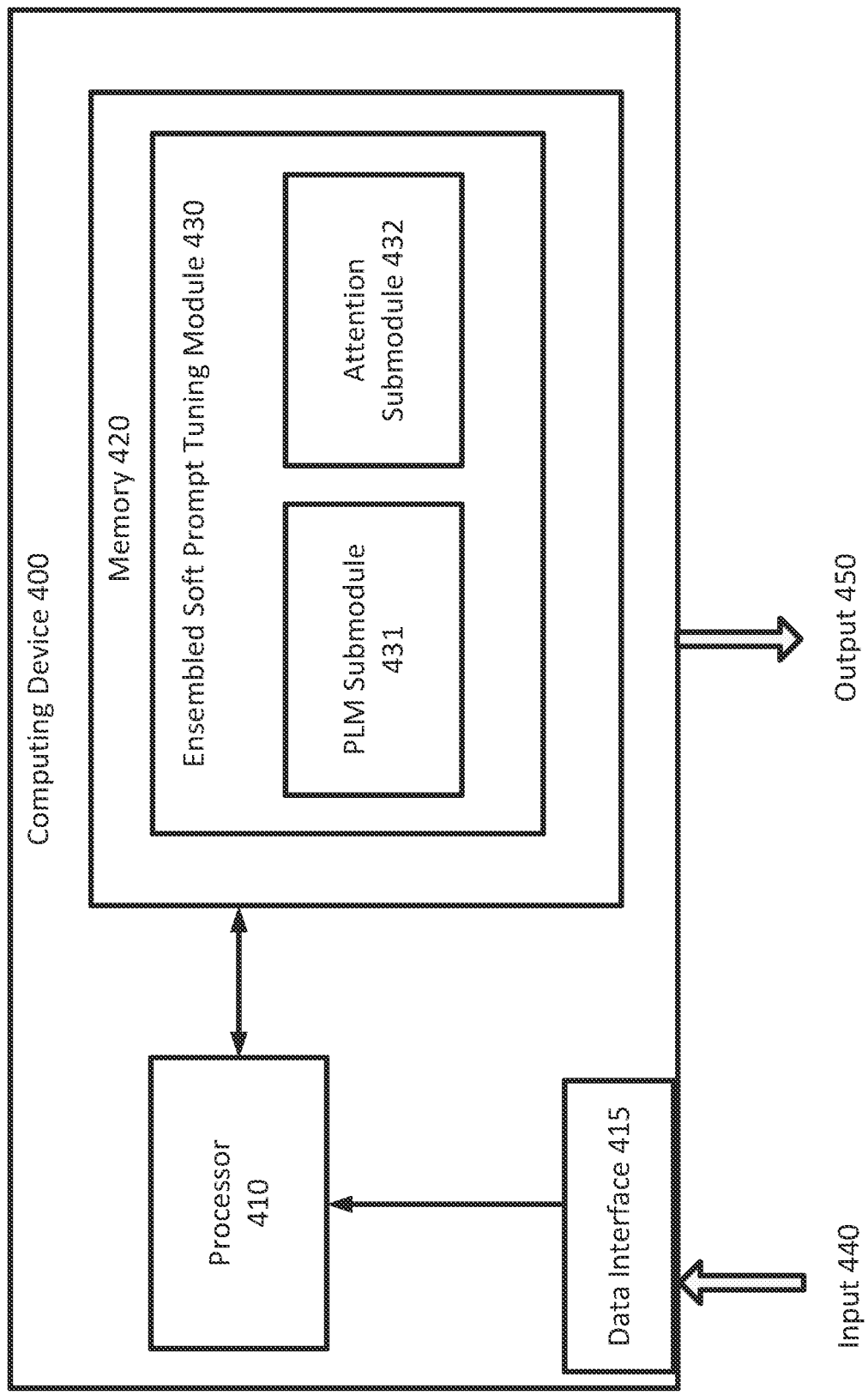
FIG. 4 is a simplified diagram illustrating a computing device implementing the ensembled soft prompt tuning system described in FIGS. 1-3, according to embodiments described herein.

FIG. 4 is a simplified diagram illustrating a computing device implementing the soft prompt tuning system described in FIGS. 1-3 according to one embodiment described herein. As shown in FIG. 4, computing device 400 includes a processor 410 coupled to memory 420. Operation of computing device 400 is controlled by processor 410. And although computing device 400 is shown with only one processor 410, it is understood that processor 410 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 400. Computing device 400 may be implemented as a stand-alone subsystem, as a board added to a computing device, and/or as a virtual machine.

Memory 420 may be used to store software executed by computing device 400 and/or one or more data structures used during operation of computing device 400. Memory 420 may include one or more types of machine-readable media. Some common forms of machine-readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 410 and/or memory 420 may be arranged in any suitable physical arrangement. In some embodiments, processor 410 and/or memory 420 may be implemented on a same board, in a same package (e.g., system-in-package), on a same chip (e.g., system-on-chip), and/or the like. In some embodiments, processor 410 and/or memory 420 may include distributed, virtualized, and/or containerized computing resources. Consistent with such embodiments, processor 410 and/or memory 420 may be located in one or more data centers and/or cloud computing facilities.

In some examples, memory 420 may include non-transitory, tangible, machine readable media that includes executable code that when run by one or more processors (e.g., processor 410) may cause the one or more processors to perform the methods described in further detail herein. For example, as shown, memory 420 includes instructions for Ensembled Soft Prompt Tuning module 430 that may be used to implement and/or emulate the systems and models, and/or to implement any of the methods described further herein. Ensembled Soft Prompt Tuning module 430 may receive input 440 such as an input training data (e.g., a natural language question) via the data interface 415 and generate an output 450 which may be an answer. Examples of the input data may include other types of natural language inputs such as a document, a text, etc. Examples of the output data may include an answer, a summary, an intent classification label, and/or the like.

The data interface 415 may comprise a communication interface, a user interface (such as a voice input interface, a graphical user interface, and/or the like). For example, the computing device 400 may receive the input 440 (such as a training dataset) from a networked database via a communication interface. Or the computing device 400 may receive the input 440, such as an articulated question, from a user via the user interface.

In some embodiments, the Ensembled Soft Prompt Tuning module 430 is configured to use pre-trained soft prompts to train the system. The Ensembled Soft Prompt Tuning module 430 may further include a PLM submodule 431 and an Attention submodule 432.

In one embodiment, the Ensembled Soft Prompt Tuning module 430 and its submodules 431-432 may be implemented by hardware, software and/or a combination thereof.

In one embodiment, the Ensembled Soft Prompt Tuning module 430 and one or more of its submodules 431-432 may be implemented via an artificial neural network. The neural network comprises a computing system that is built on a collection of connected units or nodes, referred as neurons. Each neuron receives an input signal and then generates an output by a non-linear transformation of the input signal. Neurons are often connected by edges, and an adjustable weight is often associated to the edge. The neurons are often aggregated into layers such that different layers may perform different transformations on the respective input and output transformed input data onto the next layer. Therefore, the neural network may be stored at memory 420 as a structure of layers of neurons, and parameters describing the non-linear transformation at each neuron and the weights associated with edges connecting the neurons. An example neural network may be feedforward neural network, and/or the like.

In one embodiment, the neural network based Ensembled Soft Prompt Tuning module 430 and one or more of its submodules 431-432 may be trained by updating the underlying parameters of the neural network based on the loss described in relation to FIG. 2. For example, the loss is a metric, e.g., the cross-entropy between the predicted output distribution and the actual target, that evaluates how far away a neural network model generates a predicted output value from its target output value (also referred to as the "ground-truth" value). Given the loss, the negative gradient of the loss function is computed with respect to each weight of each layer individually. Such negative gradient is computed one layer at a time, iteratively backward from the last layer to the input layer of the neural network. Parameters of the neural network are updated backwardly from the last layer to the input layer (backpropagating) based on the computed negative gradient to minimize the loss. The backpropagation from the last layer to the input layer may be conducted for a number of training samples in a number of training epochs. In this way, parameters of the neural network may be updated in a direction to result in a lesser or minimized loss, indicating the neural network has been trained to generate a predicted output value closer to the target output value.

Some examples of computing devices, such as computing device 400 may include non-transitory, tangible, machine readable media that include executable code that when run by one or more processors (e.g., processor 410) may cause the one or more processors to perform the processes of method. Some common forms of machine-readable media that may include the processes of method are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Figure 5:
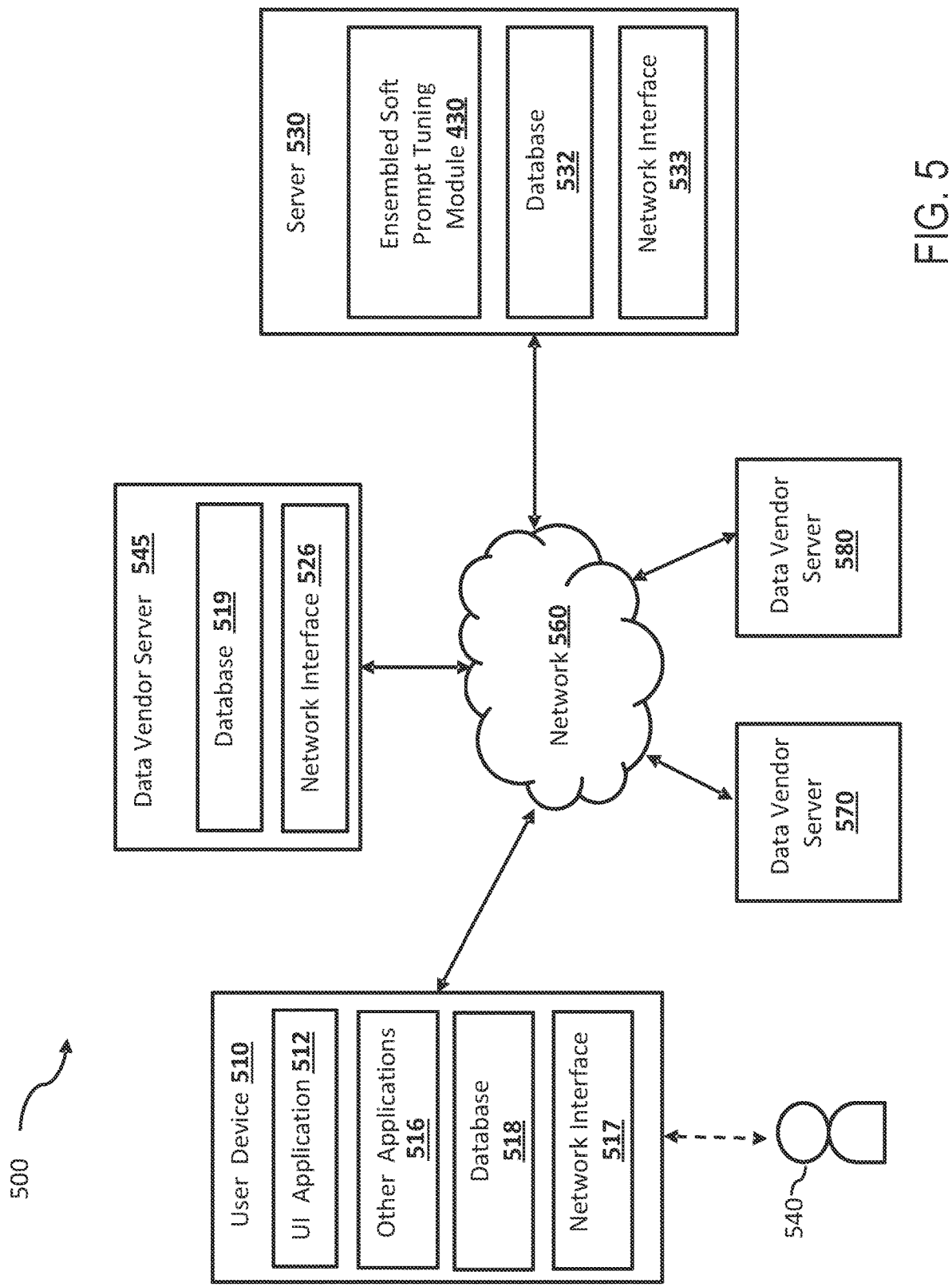
FIG. 5 is a simplified block diagram of a networked system suitable for implementing the ensembled soft prompt tuning framework described in FIGS. 1-3 and other embodiments described herein.

FIG. 5 is a simplified block diagram of a networked system 500 suitable for implementing the ensembled soft prompt tuning framework described in FIGS. 1-3 and other embodiments described herein. In one embodiment, system 500 includes the user device 510 which may be operated by user 540, data vendor servers 545, 570 and 580, server 530, and other forms of devices, servers, and/or software components that operate to perform various methodologies in accordance with the described embodiments. Exemplary devices and servers may include device, stand-alone, and enterprise-class servers which may be similar to the computing device 400 described in FIG. 4, operating an OS such as a MICROSOFT® OS, a UNIX® OS, a LINUX® OS, or other suitable device and/or server-based OS. It can be appreciated that the devices and/or servers illustrated in FIG. 5 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entities.

The user device 510, data vendor servers 545, 570 and 580, and the server 530 may communicate with each other over a network 560. User device 510 may be utilized by a user 540 (e.g., a driver, a system admin, etc.) to access the various features available for user device 510, which may include processes and/or applications associated with the server 530 to receive an output data anomaly report.

User device 510, data vendor server 545, and the server 530 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 500, and/or accessible over network 560.

User device 510 may be implemented as a communication device that may utilize appropriate hardware and software configured for wired and/or wireless communication with data vendor server 545 and/or the server 530. For example, in one embodiment, user device 510 may be implemented as an autonomous driving vehicle, a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

User device 510 of FIG. 5 contains a user interface (UI) application 512, and/or other applications 516, which may correspond to executable processes, procedures, and/or applications with associated hardware. For example, the user device 510 may receive a message indicating an output from the server 530 and display the message via the UI application 512. In other embodiments, user device 510 may include additional or different modules having specialized hardware and/or software as required.

In various embodiments, user device 510 includes other applications 516 as may be desired in particular embodiments to provide features to user device 510. For example, other applications 516 may include security applications for implementing client-side security features, programmatic client applications for interfacing with appropriate application programming interfaces (APIs) over network 560, or other types of applications. Other applications 516 may also include communication applications, such as email, texting, voice, social networking, and IM applications that allow a user to send and receive emails, calls, texts, and other notifications through network 560. For example, the other application 516 may be an email or instant messaging application that receives a prediction result message from the server 530. Other applications 516 may include device interfaces and other display modules that may receive input and/or output information. For example, other applications 516 may contain software programs for asset management, executable by a processor, including a graphical user interface (GUI) configured to provide an interface to the user 540 to view the output, such as an answer to an input question.

User device 510 may further include database 518 stored in a transitory and/or non-transitory memory of user device 510, which may store various applications and data and be utilized during execution of various modules of user device 510. Database 518 may store user profile relating to the user 540, predictions previously viewed or saved by the user 540, historical data received from the server 530, and/or the like. In some embodiments, database 518 may be local to user device 510. However, in other embodiments, database 518 may be external to user device 510 and accessible by user device 510, including cloud storage systems and/or databases that are accessible over network 560.

User device 510 includes at least one network interface component 517 adapted to communicate with data vendor server 545 and/or the server 530. In various embodiments, network interface component 517 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Data vendor server 545 may correspond to a server that hosts database 519 to provide training datasets including question-answer pairs and/or the like to the server 530. The database 519 may be implemented by one or more relational database, distributed databases, cloud databases, and/or the like.

The data vendor server 545 includes at least one network interface component 526 adapted to communicate with user device 510 and/or the server 530. In various embodiments, network interface component 526 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. For example, in one implementation, the data vendor server 545 may send asset information from the database 519, via the network interface 526, to the server 530.

The server 530 may be housed with the Ensembled Soft Prompt Tuning module 430 and its submodules described in FIG. 4. In some implementations, Ensembled Soft Prompt Tuning module 430 may receive data from database 519 at the data vendor server 545 via the network 560 to generate a response. The generated response may also be sent to the user device 510 for review by the user 540 via the network 560.

The database 532 may be stored in a transitory and/or non-transitory memory of the server 530. In one implementation, the database 532 may store data obtained from the data vendor server 545. In one implementation, the database 532 may store parameters of the Ensembled Soft Prompt Tuning module 430. In one implementation, the database 532 may store previously trained soft prompts, parameters of the PLM 100 and/or the like.

In some embodiments, database 532 may be local to the server 530. However, in other embodiments, database 532 may be external to the server 530 and accessible by the server 530, including cloud storage systems and/or databases that are accessible over network 560.

The server 530 includes at least one network interface component 533 adapted to communicate with user device 510 and/or data vendor servers 545,570 or 580 over network 560. In various embodiments, network interface component 533 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 560 may be implemented as a single network or a combination of multiple networks. For example, in various embodiments, network 560 may include the Internet or one or more intranets, landline networks, wireless networks, and/or other appropriate types of networks. Thus, network 560 may correspond to small scale communication networks, such as a private or local area network, or a larger scale network, such as a wide area network or the Internet, accessible by the various components of system 500.

Example Work Flows

Figure 6:
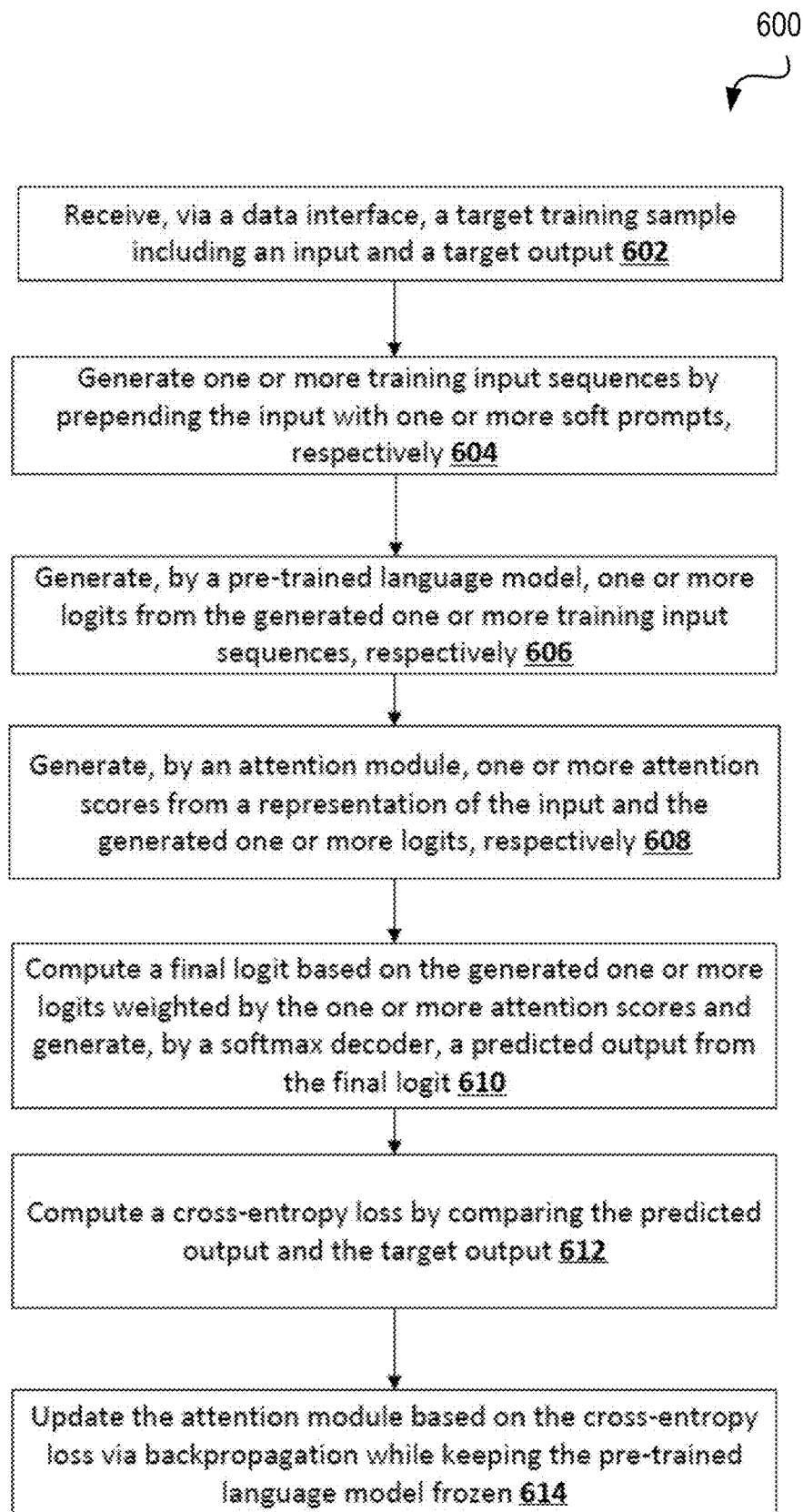
FIG. 6 is a simplified logic flow diagram illustrating a method of training the attention module, according to embodiments described herein.

FIG. 6 is an example logic flow diagram illustrating a method of training an attention module based on the framework shown in FIGS. 1-3, according to some embodiments described herein. One or more of the processes of method 600 may be implemented, at least in part, in the form of executable code stored on non-transitory, tangible, machine-readable media that when run by one or more processors may cause the one or more processors to perform one or more of the processes. In some embodiments, method 600 corresponds to the operation of the Ensembled Soft Prompt Tuning module 430 (e.g., FIGS. 4-5) that performs training of the attention module.

As illustrated in FIG. 6, the method includes a number of enumerated steps, but aspects of the method 600 may include additional steps before, after, and in between the enumerated steps. In some aspects, one or more of the enumerated steps may be omitted or performed in a different order.

At step 602, a target training sample including an input and a target output (e.g., (X,y) 212*a-d*, and y as discussed above in the description accompanying FIG. 2, relating to a training dataset associated with a target task) is received via a data interface (e.g., 415 in FIG. 4 or 533 in FIG. 5). The input and target output may be a question and answer pair, or the same embedded into a representational space. In some instances, the input and target output could come from a database (e.g. 518, 519, 532) through various means in the network system 500 of FIG. 5.

At step 604, a training input sequences is generated (e.g. by a processor 410 of FIG. 4) by prepending one or more soft prompts (e.g., 110a,110b in FIG. 2) to the input (e.g., 212a-d in FIG. 2). For example, the soft prompts may be a sequence of tokens or vectors and the input may also be a sequence of different tokens or vectors. Thus, the training input sequences will be a series of tokens or vectors longer than the sequences that constitute the soft prompts and input. Furthermore, the prepending may occur for each of the source tasks.

At step 606, a PLM (e.g., 100 in FIG. 2) generates (e.g., by a processor 410 running a PLM submodule 431 in FIG. 4) one or more logits (e.g., 214, 224, 254 in FIG. 2) in response to the generated one or more training input sequences, respectively, e.g., by transforming, via the PLM 100, the training input sequences. For example, the pre-trained language model could be a Text-To-Text Transfer Transformer (T5).

At step 608, an attention module (e.g., 200 in FIG. 2-3) generates (e.g., by a processor 410 running an Attention submodule 432 in FIG. 4) one or more attention scores (e.g., 260 in FIGS. 2-3) between a representation of the input (e.g., 202 in FIGS. 2-3) and the generated one or more logits (e.g., 214, 224, 254 in FIG. 2), respectively. The attention scores represent the contribution of the various source tasks for accomplishing the target task. In some instances, generating attention scores (e.g., 260 in FIGS. 2-3) comprises some or none of the following additional steps: a max pooling operation (e.g., 305 in FIG. 3) generates (e.g., by a processor 410 running an Attention submodule 432) a representation of the input (e.g., 202 in FIG. 2-3) from the input (e.g., 212a-d in FIG. 2); a feedforward network projects (e.g., by a processor 410 running an Attention submodule 432) the representation of the input into a projected representation of the input in a representational space; a second feedforward network projects (e.g., by a processor 410 running an Attention submodule 432) the generated one or more logits into projected one or more logits in the representational space; Layer Norm (e.g., 325, 370 in FIG. 3) is applied (e.g., by a processor 410 running an Attention module 432 in FIG. 4) to the output of the feedforward network and second feedforward network; and the attention scores are computed (e.g., by a processor 410 running an Attention submodule 432) in the representational space. The feedforward network and second feedforward network may further comprise down projection layers (e.g., 310, 355 in FIG. 3) that reduce the dimension of the representation of the input and the generated one or more logits; non-linear activation functions, (e.g., 315,360 in FIG. 3); and up projection layers (e.g., 320, 365 in FIG. 3) that produce output in the representational space.

At step 610, the attention scores (e.g., 260 in FIGS. 2-3) and generated logits (e.g., 214, 224, 254 in FIG. 2) are used to generate a final logit (e.g., 262 in FIG. 2). For example, a linear combination is generated by multiplying/weighting each of the generated logits by its respective attention score. In some instances, a softmax decoder (e.g., 265 in FIG. 2) may generate a predicted output (e.g., 270 in FIG. 2) from the final logit (e.g., 262 in FIG. 2).

At step 612, a cross-entropy loss is computed (e.g., by processor 410) by comparing the predicted output (e.g. 270 in FIG. 2) and the target output (e.g., y as discussed above in the description accompanying FIG. 2, relating to a training dataset associated with a target task).

At step 614, the attention module (e.g., 200 in FIGS. 2-3) is updated (e.g., by a processor 410 running the Attention submodule 432) based on the cross-entropy loss via backpropagation while keeping the pre-trained language model (e.g, 100 in FIGS. 1-2) frozen. In some instances, gradients of the loss function are computed and used in updating the parameters of the network during backpropagation. In some instances, the attention module has a smaller set of parameters than the PLM.

Figure 7:
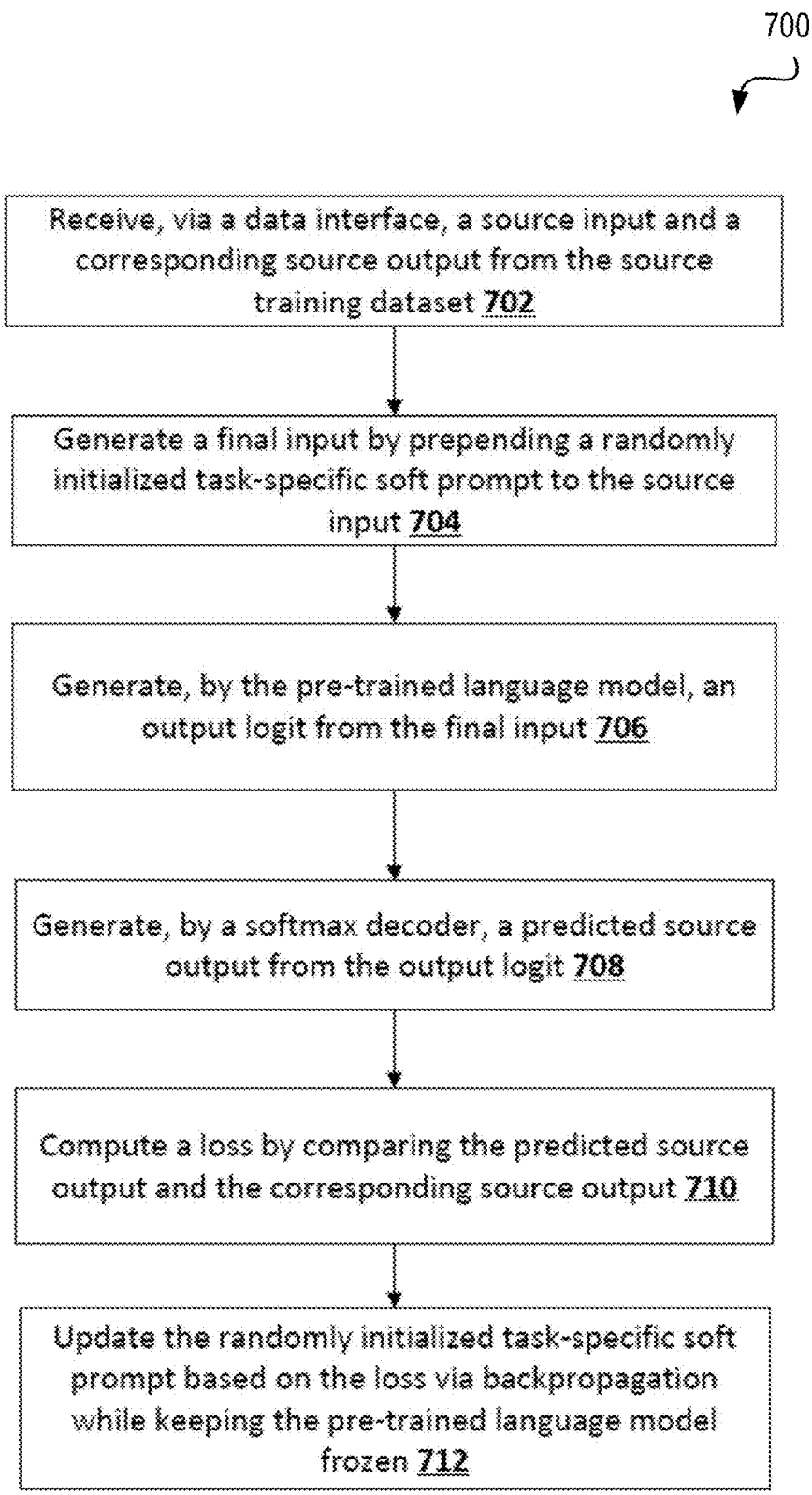
FIG. 7 is a logic flow illustrating a method of soft prompt tuning, according to embodiments described herein.

FIG. 7 is an example logic flow diagram illustrating a method of soft prompt training with a frozen pre-trained language model based on the framework shown in FIG. 1, according to some embodiments described herein. One or more of the processes of method 700 may be implemented, at least in part, in the form of executable code stored on non-transitory, tangible, machine-readable media that when run by one or more processors may cause the one or more processors to perform one or more of the processes. In some embodiments, method 700 corresponds to the operation of the Ensembled Soft Prompt Tuning module 430 (e.g., FIGS. 4-5) that performs training of the soft prompts.

As illustrated, the method 700 includes a number of enumerated steps, but aspects of the method 700 may include additional steps before, after, and in between the enumerated steps. In some aspects, one or more of the enumerated steps may be omitted or performed in a different order.

At step 702, a source input (e.g., 112a-d in FIG. 1) and corresponding source output (e.g., y as discussed above in the description accompanying FIG. 1, relating to training data associated with a source task) from a source training dataset are received via a data interface (e.g., 415 in FIG. 4 or 533 in FIG. 5). The source input may take the form of a sequence of token embeddings or vectors representing a natural language sentence. The corresponding output may be in the form of a classifier or other quantity associated with the corresponding input. The input and target output may be a question and answer pair, or the same embedded into a representational space. In some instances, the source input and corresponding output could come from a database (e.g. 518, 519, 532) through various means in the network system 500 of FIG. 5. In some instances, the source training dataset and training dataset associated with a target task may be different. In some instances, the target tasks and source tasks are different.

At step 704, a final input is generated (e.g., by a processor 410 in FIG. 4) by prepending a randomly initialized task-specific soft prompt (e.g., 110a,110b in FIG. 1) to the source input (e.g., 112a-d in FIG. 1) received in the previous step. The randomly initialized task-specific soft prompts are composed of one or more continuous, as opposed to discrete, vectors/tokens.

At step 706, the PLM (e.g., 100 in FIG. 1) generates (e.g., by a processor 410 running a PLM submodule 431 in FIG. 4) an output logit (e.g., 114 in FIG. 1) from the final input.

At step 708, softmax (e.g., 116 in FIG. 1) is applied to the output logit (e.g., 114 in FIG. 1) to generate a predicted source output (e.g., 118 in FIG. 1). The predicted source output may be a classifier or the answer to a question.

At step 710, a loss is computed (e.g., by processor 410 running an Ensembled Soft Prompt Tuning Module 430 in FIG. 4) by comparing predicted source output (e.g., 118 in FIG. 1) and corresponding source output (e.g., y as discussed above in the description accompanying FIG. 1, relating to training data associated with a source task).

At step 712, the randomly initialized task-specific soft prompts (e.g., 110a, 110b in FIG. 1) are updated (e.g., by a processor 410 running an Ensembled Soft Prompt Tuning Module 430 in FIG. 4) based on the loss via backpropagation. For example, using the probability described in the description accompanying FIG. 1, above.

Example Data Experiment Performance

FIGS. 8-16 represent exemplary test results using embodiments described herein. These embodiments will be denoted by "SESoM" in the discussion that follows. The use of one term "SESoM" does not signify a single embodiment. Comparisons are made to SPoT-t as described in Vu et al., SPoT: Better frozen model adaptation through soft prompt transfer, in Proceedings of the 60$^{th}$ Annual Meeting of the Association for Computational Linguistics, Volume 1, pages 5039-5059, 2022; PPT as described in Gu et al., PPT: Pre-trained prompt tuning for few-shot learning, in Proceedings of the 60$^{th}$ Annual Meeting of the Association for Computational Linguistics, Volume 1, pages 8410-8423, 2022; and ATTEMPT as described in Asai et al., Attentional mixtures of soft prompt tuning for parameter-efficient multitask knowledge sharing, arXiv: 2205.11961v1, 2022.

The pre-trained language models used are T5-base, T5-large and T5-XL as described in Raffel et al., Exploring the limits of transfer learning with a unified text-to-text transformer, in Journal of Machine Learning Research, pages 1-67, 2020.

Datasets used in the comparison for training the soft prompts include MNLI as described in Williams et al., A broad-coverage challenge corpus for sentence understanding through inference, in Proceedings of the 2018 Conference of the North American Chapter of the Association for Computational Linguistics: Human Language Technologies, Volume 1, pages 1112-1122, 2018; QNLI as described in Demszky et al., Transforming question answering datasets into natural language inference datasets, arXiv: 1809.02922, 2018; QQP as described in Wang et al., GLUE: A multi-task benchmark and analysis platform for natural language understanding, in Proceedings of the 2018 EMNLP Workshop BlackboxNLP: Analyzing and Interpreting Neural Networks for NLP, pages 353-355, 2018; SST2 as described in Socher et al., Recursive deep models for semantic compositionality over a sentiment treebank, in Proceedings of the 2013 Conference on Empirical Methods in Natural Language Processing, pages 1631-1642, 2013; SQuAD as described in Rajpurkar et al., SQuAD: 100,00+ questions for machine comprehension of text, in Proceedings of the 2016 Conference on Empirical Methods in Natural Language Processing, pages 2383-2392, 2016; ReCoRD as described in Zhang et al., Record: Bridging the gap between human and machine commonsense reading comprehension, arXiv: 1810.12885, 2018.

Datasets used in the comparison for training and evaluating the attention module include WNLI as described in Wang et al., GLUE: A multi-task benchmark and analysis platform for natural language understanding, in Proceedings of the 2018 EMNLP Workshop BlackboxNLP: Analyzing and Interpreting Neural Networks for NLP, pages 353-355, 2018; MRPC as described in Dolan et al., Microsoft research paraphrase corpus, 2005; BoolQ as described in Clark et al., BoolQ: Exploring the surprising difficulty of natural yes/no questions, in Proceedings of the 2019 North American Chapter of the Association for Computational Linguistics: Human Language Technologies, Volume 1, pages 2924-2936, 2019; MultiRC as described in Khashabi et al., Looking beyond the surface: A challenge set for reading comprehension over multiple sentences, Proceedings of the North American Chapter of the Association for Computational Linguistics: Human Language Technologies, Volume 1, pages 252-262, 2018; RTE as described in Giampiccolo et al., The third pascal recognizing textual entailment challenge, in Proceedings of the ACL-PASCAL Workshop on Textual Entailment and Paraphrasing, pages 1-9, 2007; WiC as described in Pilehvar & Camacho-Collados, WiC: the word-in-context dataset for evaluating context-sensitive meaning representations, in Proceedings of the 2019 Conference of the North American Chapter of the Association for Computational Linguistics: Human Language Technologies, Volume 1, pages 1267-1273, 2019; WSC as described in Levesque et al., The winograd schema challenge, in Thirteenth International Conference on the Principles of Knowledge Representation and Reasoning, pages 552-561, 2012; and CB as described in DeMarneffe et al., The commitmentbank: Investigating projection in naturally occurring discourse, in Proceedings of Sinn and Bedeutung, Volume 23, pages 107-124, 2019.

There is one source prompt $P_i$ for each of the six source tasks. Each of the $P_i$ is composed of a 100 d-dimensional (d is called the embedding dimension) vectors $p_j$ and can be written in an equation as $P_i=[p_1, \ldots, p_{100}]$. The embedding dimension, d, for each of the pre-trained language models is 768, 1024, and 1024 for T5-Base, T5-Large, and T5-XL, respectively.

FIG. 8 provides few-shot performance of one embodiment, SESoM, versus 6 baselines. All of the scores are averages of 20 runs with different random seeds, with standard errors included in subscripts. Each run uses 32 samples for training of the target task. The best scores are in bold. "Uni Ensemble" is the abbreviation for Uniform Ensemble. "MV Ensemble" is the abbreviation for Majority-vote Ensemble. "FW Ensemble" is the abbreviation for Fixed-weight Ensemble. Performance is compared for three pre-trained language models, T5-Base, T5-Large, and T5-XL. For all pre-trained language models, SESoM outperforms all baselines on average score. In addition, SESoM on T5-Base outperforms non-ensemble baselines (SPoT-t, PPT, and ATTEMPT) on T5-Large based on the average scores and for most tasks. SESoM on T5-Large matches or outperforms the non-ensemble baselines on T5-XL based on the average scores and most of the individual task.

FIG. 9 provides an exemplary the few-shot performance of one embodiment, SESoM, for varying numbers of best source tasks. All results are the average of 20 runs with different random seeds. Standard errors are included in subscripts. "#s." stands for the number of source tasks used in SESoM. Given each target task, the top 1, 3, and 5 most helpful source tasks are selected. Then SESoM is applied separately with each number of the top source tasks (i.e., 1, 3, and 5 source tasks). The results show that as the number of source tasks increases SESoM can achieve improved performance.

FIG. 10 provides an exemplary comparison of few shot-performance for various sizes of training datasets on the target tasks. SESoM outperforms other methods based on the average score as well as a majority of task-specific scores for each training label data size. All scores are the average of 5 runs, with standard errors included in subscripts.

FIG. 11 provides an exemplary comparison of SESoM to other design choices on a pre-trained T5-Base model. All scores are the average of 20 runs, with standard errors included in subscripts. SESoM outperforms both Ensemble acc soft prompts ("Ensemble acc SP") and Pseudo Label Generation. In Ensemble acc SP, the source prompts, as opposed to the generated logits, are provided to the attention module. In PLG, source prompts were tuned on target data sets with the few-shot target training data. Then the trained source prompts are used with the pre-trained language model to generate pseudo labels for each for the entire target dataset. The final pseudo label for each target sample is determined by majority voting of the 6 source tasks. The samples with final pseudo labels are then used to train the soft prompt of the target task before few-shot prompt tuning with the few shot target training data. SESoM outperforms both Ensemble acc SP and PLG on each target task.

FIG. 12 provides an exemplary comparison between the predictions of SESoM and source tasks for the target task, MRPC. The MRPC task asks the model to decide whether two given sentences are equivalent. "Label" is ground truth label and "Pred" is the predicted label obtained by SESoM with weights shown in the table. "Preds from individual source" shows predictions of each source model. A prediction of "1" means equivalent, while "0" means not equivalent. For Example #1, both source models QNLI and QQP make the correct prediction. Correspondingly, the SESoM places the highest weights on QNLI and QQP for making its prediction. Similarly, for Example #2, SESoM places the highest weights on 2 out of the 3 source models that make a correct prediction.

FIG. 13 provides the various dimensions of the attention module as configured to produce the data in FIG. 8.

FIG. 14 provides an exemplary comparison of SESoM with another method for 8 samples of few-shot training labels on target tasks. All the scores are the average of 10 runs, with standard errors included in subscripts. SESoM outperforms FW Ensemble on a majority of target tasks, and SESoM has a higher average score from all target tasks.

FIG. 15 provides an exemplary comparison between SESoM configured with and without prompt tuning based on results on target tasks with different numbers of few-shot training samples. SESoM with prompt tuning (SESoM w. PT) has increasing performance relative to SESoM without prompt tuning (SESom w/o PT) for increasing few-shot training sample data sizes. All scores of the data size of 8, 32, and 128 are the average of 10, 10, and 5 runs, with standard errors included in subscripts.

FIG. 16 provides an exemplary comparison between SESoM and Hard Variant. Hard Variant takes the attention weights and uses the source model with the highest weight to make the prediction. SESoM outperforms Hard Variant across all target tasks. Results on target tasks with 32 samples of few-shot training labels with different ensemble. All the scores are the average of 20 runs, with standard errors included in subscripts.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and, in a manner, consistent with the scope of the embodiments disclosed herein.

What is claimed is:

1. A method of training a classification framework comprising one or more pre-trained language models and an attention module via soft prompt tuning in few-shot settings, the method comprising:

receiving, via a data interface, a target training sample including a first input and a target output corresponding to a target task;

generating one or more training input sequences by prepending the first input with one or more soft prompts that are trained according to a source training task, respectively;

generating, by the one or more pre-trained language models, one or more logits from the generated one or more training input sequences combining the first input and the one or more soft prompts, respectively;

generating, by the attention module, one or more attention scores in response to a second input combining the representation of the first input and the generated one or more logits;

computing a final logit based on the generated one or more logits weighted by the one or more attention scores;

normalizing, by a softmax decoder, the final logit to generate a predicted output;

computing a cross-entropy loss by comparing the predicted output and the target output;

updating the attention module based on the cross-entropy loss via backpropagation while keeping the pre-trained language model and the one or more soft prompts frozen; and using the classification framework comprising the one or more pre-trained language models, the updated attention module and the softmax decoder to generate a classification output corresponding to the target task.

2. The method of claim 1, wherein the soft prompts are trained using a source training dataset that is on a different domain or task from the target training sample.

3. The method of claim 2, wherein the soft prompts are trained by:

receiving, via a data interface, a source input and a corresponding source output from the source training dataset;

generating a final input by prepending a randomly initialized task-specific soft prompt to the source input;

generating, by the pre-trained language model, an output logit from the final input;
generating, by a softmax decoder, a predicted source output from the output logit;
computing a loss by comparing the predicted source output and the corresponding source output; and
updating the randomly initialized task-specific soft prompt based on the loss via backpropagation while keeping the pre-trained language model frozen.

4. The method of claim 1, wherein the one or more attention scores are generated by:
generating, by a max pooling operation, the representation of the first input;
projecting the representation of the first input into a projected representation of the first input in a representational space;
projecting the generated one or more logits into projected one or more logits in the representational space; and
computing the one or more attention scores based on the projected representation of the first input and the projected one or more logits.

5. The method of claim 4, further comprising:
applying normalization to the projected representation of the first input; and
applying normalization to the projected one or more logits.

6. The method of claim 4, further comprising:
generating, by a down projection layer, a reduced representation from the representation of the first input;
generating, by a non-linear activation function, a non-linear reduced representation from the reduced representation; and
generating, by an up projection layer, the projected representation of the first input from the non-linear reduced representation.

7. The method of claim 1, wherein the attention module has a smaller set of parameters than the pre-trained language model.

8. A system for training a classification framework comprising one or more pre-trained language models and an attention module via soft prompt tuning in few-shot settings, the system comprising:
a communication interface that receives a plurality of training samples;
a memory containing machine readable medium storing machine executable code; and
one or more processors coupled to the memory and configurable to execute the machine executable code to cause the one or more processors to:
receive, via a data interface, a target training sample including a first input and a target output corresponding to a target task;
generate one or more training input sequences by prepending the first input with one or more soft prompts that are trained according to a source training task, respectively;
generate, by the one or more pre-trained language models, one or more logits from the generated one or more training input sequences combining the first input and the one or more soft prompts, respectively;
generate, by the attention module, one or more attention scores in response to a second input combining the representation of the first input and the generated one or more logits corresponding to the one or more training input sequences combining the input and the one or more soft prompts, respectively;
compute a final logit based on the generated one or more logits weighted by the one or more attention scores;
normalize, by a softmax decoder, the final logit to generate a predicted output;
compute a cross-entropy loss by comparing the predicted output and the target output;
update the attention module based on the cross-entropy loss via backpropagation while keeping the pre-trained language model and the one or more soft prompts frozen; and
use the classification framework comprising the one or more pre-trained language models, the updated attention module and the softmax decoder to generate a classification output corresponding to the target task.

9. The system of claim 8, wherein the one or more processors are configurable to execute the machine executable code to cause the one or more processors to train the soft prompts using a source training dataset that is on a different domain or task from the target training sample.

10. The system of claim 9, wherein the one or more processors are configurable to execute the machine executable code to cause the one or more processors to train the soft prompts comprising:
receive, via a data interface, a source input and a corresponding source output from the source training dataset;
generating a final input by prepending a randomly initialized task-specific soft prompt to the source input;
generate, by the pre-trained language model, an output logit from the final input;
generate, by a softmax decoder, a predicted source output from the output logit;
compute a loss by comparing the generated output and the corresponding source output; and
update the randomly initialized task-specific soft prompt based on the loss via backpropagation while keeping the pre-trained language model frozen.

11. The system of claim 8, wherein the one or more processors are configurable to execute the machine executable code to cause the one or more processors to generate attention scores comprising:
generate, by a max pooling operation, the representation of the first input;
project the representation of the first input into a projected representation of the first input in a representational space;
project the generated one or more logits into projected one or more logits in the representational space; and
compute the one or more attention scores based on the projected representation of the first input and the projected one or more logits.

12. The system of claim 11, further comprising:
apply normalization to the projected representation of the first input; and
apply normalization to the projected one or more logits.

13. The system of claim 11, further comprising:
generate, by a down projection layer, a reduced representation from the representation of the first input;
generate, by a non-linear activation function, a non-linear reduced representation from the reduced representation; and
generate, by an up projection layer, the projected representation of the first input from the non-linear reduced representation.

14. The system of claim 8, wherein the attentional module has a smaller set of parameters than the pre-trained language model.

15. A non-transitory computer readable medium storing instructions thereon, that when executed by a computing device cause the computing device to perform operations comprising:
receiving, via a data interface, a target training sample including a first input and a target output corresponding to a target task;
generating one or more training input sequences by prepending the first input with one or more soft prompts that are trained according to a source training task, respectively;
generating, by the one or more pre-trained language models, one or more logits from the generated one or more training input sequences combining the first input and the one or more soft prompts, respectively;
generating, by the attention module, one or more attention scores in response to a second input combining the representation of the first input and the generated one or more logits;
computing a final logit based on the generated one or more logits weighted by the one or more attention scores;
normalizing, by a softmax decoder, the final logit to generate a predicted output;
computing a cross-entropy loss by comparing the predicted output and the target output;
updating the attention module based on the cross-entropy loss via backpropagation while keeping the pre-trained language model and the one or more soft prompts frozen; and
using the classification framework comprising the one or more pre-trained language models, the updated attention module and the softmax decoder to generate a classification output corresponding to the target task.

16. The non-transitory computer readable medium of claim 15, where in the soft prompts are trained using a source training dataset that is on a different domain or task from the target training sample.

17. The non-transitory computer readable medium of claim 16, where in the soft prompts are trained by:
receiving, via a data interface, a source input and a corresponding source output from the source training dataset;
generating a final input by prepending a randomly initialized task-specific soft prompt to the source input;
generating, by the pre-trained language model, an output from the final input;
generating, by a softmax decoder, a predicted source output from the output logit;
computing a loss by comparing the predicted source output and the corresponding source output; and
updating the randomly initialized task-specific soft prompt based on the loss via backpropagation while keeping the pre-trained language model frozen.

18. The non-transitory computer readable medium of claim 15, wherein one or more attention scores are generated by:
generating, by a max pooling operation, the representation of the first input;
projecting the representation of the first input into a projected representation of the first input in a representational space;
projecting the generated one or more logits into projected one or more logits in the representational space; and
computing the one or more attention scores based on the projected representation of the first input and the projected one or more logits.

19. The non-transitory computer readable medium of claim 18, further comprising:
applying normalization to the projected representation of the first input; and
applying normalization to the projected one or more logits.

20. The non-transitory computer readable medium of claim 18, further comprising:
generating, by a down projection layer, a reduced representation from the representation of the first input;
generating, by a non-linear activation function, a non-linear reduced representation from the reduced representation; and
generating, by an up projection layer, the projected representation of the first input from the non-linear reduced representation.

* * * * *